US011033000B2

(12) United States Patent
Carlton et al.

(10) Patent No.: US 11,033,000 B2
(45) Date of Patent: Jun. 15, 2021

(54) ELECTRIC FENCE CONNECTION SYSTEM

(71) Applicant: ES Robbins Corporation, Muscle Shoals, AL (US)

(72) Inventors: John David Carlton, Florence, AL (US); Harry Lynn Raney, Florence, AL (US); Tara Nichole Nesmith, Waterloo, AL (US); Bonnie Ann Pardue, Muscle Shoals, AL (US)

(73) Assignee: ES ROBBINS CORPORATION, Muscle Shoals, AL (US)

( * ) Notice: Subject to any disclaimer, the term of this patent is extended or adjusted under 35 U.S.C. 154(b) by 623 days.

(21) Appl. No.: 15/926,996

(22) Filed: Mar. 20, 2018

(65) Prior Publication Data

US 2018/0317447 A1 Nov. 8, 2018

Related U.S. Application Data

(60) Provisional application No. 62/503,139, filed on May 8, 2017.

(51) Int. Cl.
*A01K 3/00* (2006.01)
*H01B 1/12* (2006.01)
(Continued)

(52) U.S. Cl.
CPC ............. *A01K 3/005* (2013.01); *H01B 1/124* (2013.01); *H01R 4/2483* (2013.01); *H01R 4/36* (2013.01);
(Continued)

(58) Field of Classification Search
CPC ........ A01K 3/005; H01R 4/183; H01R 4/184; H01R 4/186; H01R 4/24; H01R 4/2404;
(Continued)

(56) References Cited

U.S. PATENT DOCUMENTS 2,359,256 A * 9/1944 Spence ................ H01R 4/2408 439/416
2,429,857 A * 10/1947 Verner ................ H01B 17/145 174/161 F
(Continued)

FOREIGN PATENT DOCUMENTS

WO WO-2012048371 A1 * 4/2012

*Primary Examiner* — Jonathan P Masinick
(74) *Attorney, Agent, or Firm* — Brinks Gilson & Lione

(57) ABSTRACT

An electric fence connection system includes a body formed with a slot have a predetermined depth. The slot may be formed to receive a polymer coated cable such that at least a portion of the polymer coated cable is surround by the body. The body may be formed to also include a first threaded aperture that extends through the body to the slot. A first threaded fastener may be sized to threadably engage the first threaded aperture. The first threaded fastener may include a head at a proximate end, a conical tip at a distal end and threads along a shaft of the fastener between the distal and the proximate end. The conical tip of the first threaded fastener may be formed to pierce the polymer coated cable positioned in the slot. The body may be formed with a second aperture formed to receive a power supply cable to supply electrical power to the polymer coated cable via the first threaded fastener.

19 Claims, 3 Drawing Sheets

(51) Int. Cl.

| | |
|---|---|
| ***H05C 3/00*** | (2006.01) |
| ***H01R 13/73*** | (2006.01) |
| ***H01R 13/40*** | (2006.01) |
| ***H01R 11/05*** | (2006.01) |
| ***H01R 4/2483*** | (2018.01) |
| ***H01R 4/36*** | (2006.01) |

(52) U.S. Cl.
CPC ............. *H01R 11/05* (2013.01); *H01R 13/40* (2013.01); *H01R 13/73* (2013.01); *H05C 3/00* (2013.01)

(58) Field of Classification Search
CPC .. H01R 4/2408; H01R 4/2475; H01R 4/2783; H01R 4/36; H01R 13/40; H01B 1/124; H01B 17/145; H01B 5/008
USPC ............................................................ 256/10
See application file for complete search history.

(56) References Cited

U.S. PATENT DOCUMENTS

| | | | | |
|---|---|---|---|---|
| 3,585,571 A * | 6/1971 | Davis | H01R 4/2483 | 439/416 |
| 6,099,344 A * | 8/2000 | Chadbourne | H01R 4/2483 | 439/416 |
| 6,338,658 B1 * | 1/2002 | Sweeney | H01R 4/36 | 439/709 |
| 8,424,850 B2 * | 4/2013 | Bennette | F21V 33/006 | 256/65.05 |
| 8,616,905 B2 * | 12/2013 | McGregor | H01R 9/031 | 439/207 |
| 9,577,351 B2 * | 2/2017 | Martin | H01R 4/2408 | |
| 9,979,116 B2 * | 5/2018 | Hinsch | H01R 13/74 | |
| 10,109,930 B2 * | 10/2018 | Peltier | H01R 4/36 | |
| 10,122,096 B2 * | 11/2018 | Ruland | H01R 4/36 | |
| 10,811,792 B2 * | 10/2020 | Martin | H01R 4/64 | |
| 2012/0115373 A1 * | 5/2012 | Pini | H01R 4/36 | 439/814 |
| 2012/0222718 A1 * | 9/2012 | Sweeney | H01R 4/38 | 136/244 |
| 2012/0305723 A1 * | 12/2012 | Heath | F16B 2/065 | 248/228.1 |
| 2014/0322990 A1 * | 10/2014 | Umlaut | H01R 11/09 | 439/814 |
| 2015/0155640 A1 * | 6/2015 | Frank | F16B 33/02 | 439/797 |
| 2018/0254128 A1 * | 9/2018 | Stoner | A01K 3/005 | |
| 2019/0260142 A1 * | 8/2019 | Ruggiero | H01R 4/2408 | |
| 2020/0052442 A1 * | 2/2020 | Yuratich | H01R 13/655 | |
| 2020/0059013 A1 * | 2/2020 | Ruggiero | H01R 4/2483 | |

* cited by examiner

ELECTRIC FENCE CONNECTION SYSTEM

PRIORITY CLAIM

This application claims priority to provisional application Ser. No. 62/503,139, filed May 8, 2017, which is entirely incorporated by reference.

TECHNICAL FIELD

This disclosure relates to electric fences and more particularly to connection systems for electric fences.

BACKGROUND

Barriers in the form of fences are used to keep animals or humans in or out of an area typically defined by the fence. One form of fence is an electric fence, which can operate as a deterrent by providing an electric shock to the human or animal that comes into contact with conducting part of the electric fence. An electric fence may be powered by a power source. The power source may energize the electric fence on a predetermined schedule, such as about every 5-10 seconds.

A human or animal coming into contact with an electric fence may be shocked if an electric pulse is emitted by the power source during the contact. Current in the electric fence runs through the body of the human or animal via the contacting part, runs through the ground, and returns to the neutral of the power source.

Installation of electric fencing can be challenging and time consuming due to the need to maintain electrical continuity, insulate the electric fence and supply power to the fence. Thus, more efficient and easier ways to install an electrical fence are needed.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

SUMMARY

An electric fence connection system includes a body formed with a slot or having a predetermined depth. The slot may be formed to receive a polymer coated cable such that at least a portion of the polymer coated cable is surrounded by the body. The body may be formed to also include a first threaded aperture that extends through the body to the slot. A first threaded fastener may be sized to threadably engage the first threaded aperture. The first threaded fastener may include a head at a proximate end, a conical tip at a distal end and threads along a shaft of the fastener between the distal and the proximate end. The conical tip of the first threaded fastener may be formed to pierce the polymer coated cable positioned in the slot. The body may be formed with a second aperture formed to receive a power supply cable to supply electrical power to the polymer coated cable via the first threaded fastener.

DETAILED DESCRIPTION

The discussion below makes reference to electrified fencing and more particular to polymer based electrified fencing formed to include a polymer coated cable. The polymer surrounding the cable may be capable of conducting electric current. Thus, objects that come into contact with the polymer surrounding the cable may receive an electric shock. Power for the polymer coated cable may be provided from a power supply. Interconnection between the power supply and the polymer coated cable may be provided by a power cable, or "stinger." The power cable may be terminated at the power supply. Termination of the power cable at the polymer coated cable may be performed with an electric fence connection system.

Figure 1:
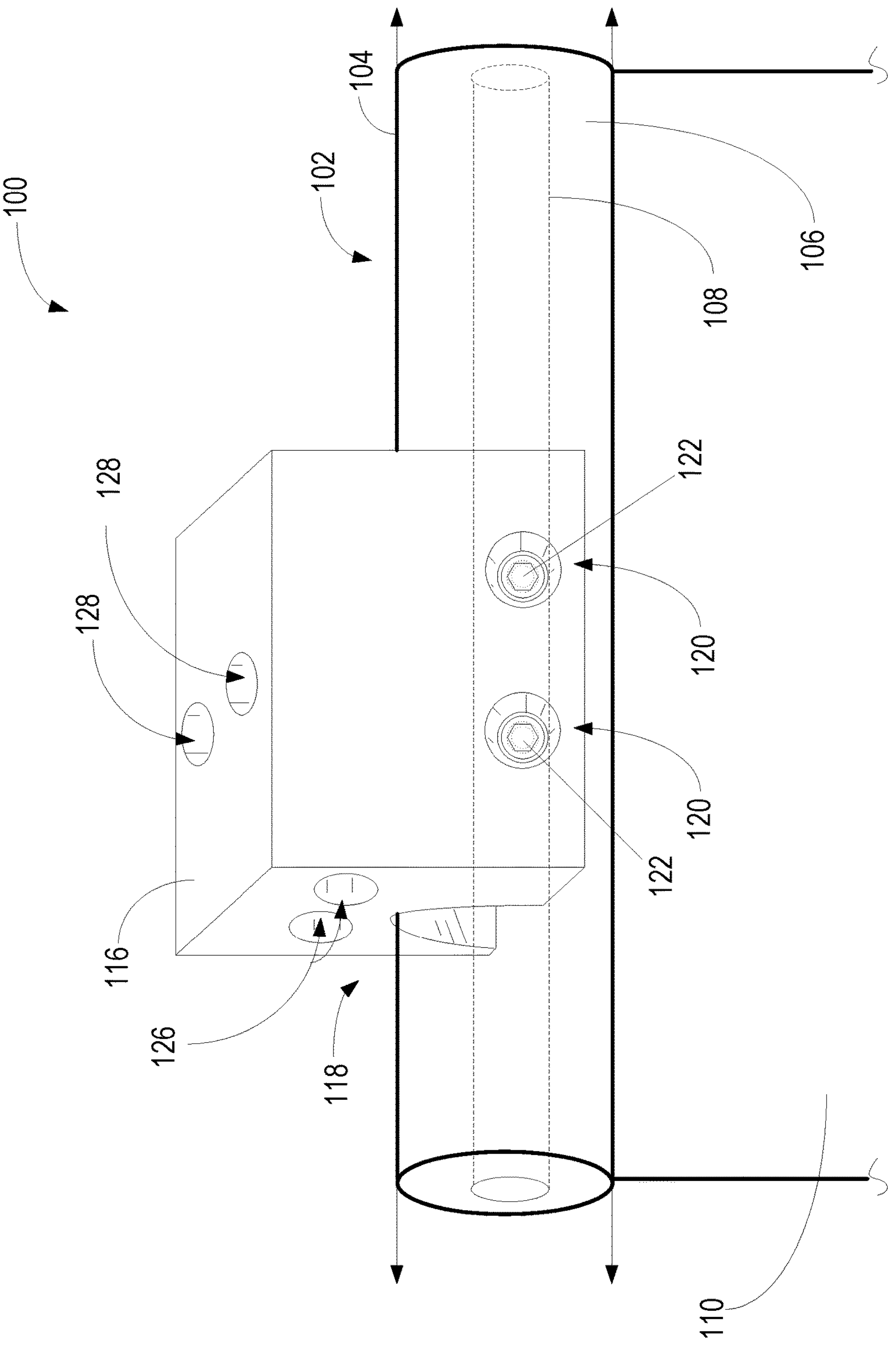
FIG. 1 is a perspective side view of an example of an electric fence connection system mounted on an electric fence.

FIG. 1 is a perspective side view of an example of an electric fence connection system 100 mounted on an electric fence 102. The electric fence 102 is a polymer based fencing material that may include a polymer coated cable 104 or polymer coated flexible rail forming at least a part of the electric fence. The polymer coated cable 104 includes a surrounding polymer material 106, and a conductor 108. The conductor 108 and the surrounding polymer material 106 may conduct electrical current and voltage. The polymer coated cable 104 may represent an independent strand of the electric fence 102, or the polymer coated cable 102 may be formed as part of a multi-strand fence webbing 110 containing one or more cables.

One or more of the cables may be power cables formed with conductive material, such as steel. The polymer material 106 surrounding the power cable may be formed by, for example extrusion molding of a plastic around the power cable. In the case of multi-strand fence webbing, plastic may be extrusion molded around the cables to form a web between any number of the cables. The plastic may be polyvinyl chloride, thermo plastic polyolefin, polypropylene/rubber compositions, or other vinyl-based or other types of modified thermoplastic polymer. The polymer coating 106 surrounding the power cable 108 may be infused with an electrically conductive filler material, such as carbon, metal particles, or any other materials that will provide sufficient conductivity such that an electrical connection between the polymer coating 106 and ground will create a flow of current. Cables included in the multi-strand webbing which are non-power cables may be formed of a high tensile strength material such as 12.5 gauge galvanized or non-galvanized wire. Alternatively, or in addition, the non-power cables may be formed of other materials with desirable tensile strength characteristics such as glass fiber or synthetics such as polyester or nylon formed in mono-filament or poly-filament cords, as well as ropes or cables.

The electric fence connection system 100 may include a body 116. The body 116 may be formed of an electrically conductive material such as steel or aluminum, and include a channel or slot 118 formed therein. The channel or slot 118 may be formed with a predetermined width and depth to receive at least part of the polymer coated cable 104 such that the polymer coated cable is at least partially surrounded by the body 116 and extends into the body 116 a predetermined distance. In an example configuration, the body 116 is about 19.05 mm tall, 19.05 mm deep, and 25.4 mm wide, and the slot or channel 116 is about 9.65 mm deep, and 5.59 mm wide with a rounded or radius bottom to align with a rounded outer surface of the polymer coated cable 104. The body 116 may also include one or more threaded apertures 120 extending through the body to the channel 118. Each of the threaded apertures 120 may be sized to receive a threaded fastener 122. Although two threaded apertures 120 and threaded fasteners 122 are depicted in FIG. 1, in other examples one or more than two threaded apertures 120 and corresponding threaded fasteners 122 may be present.

Figure 2:
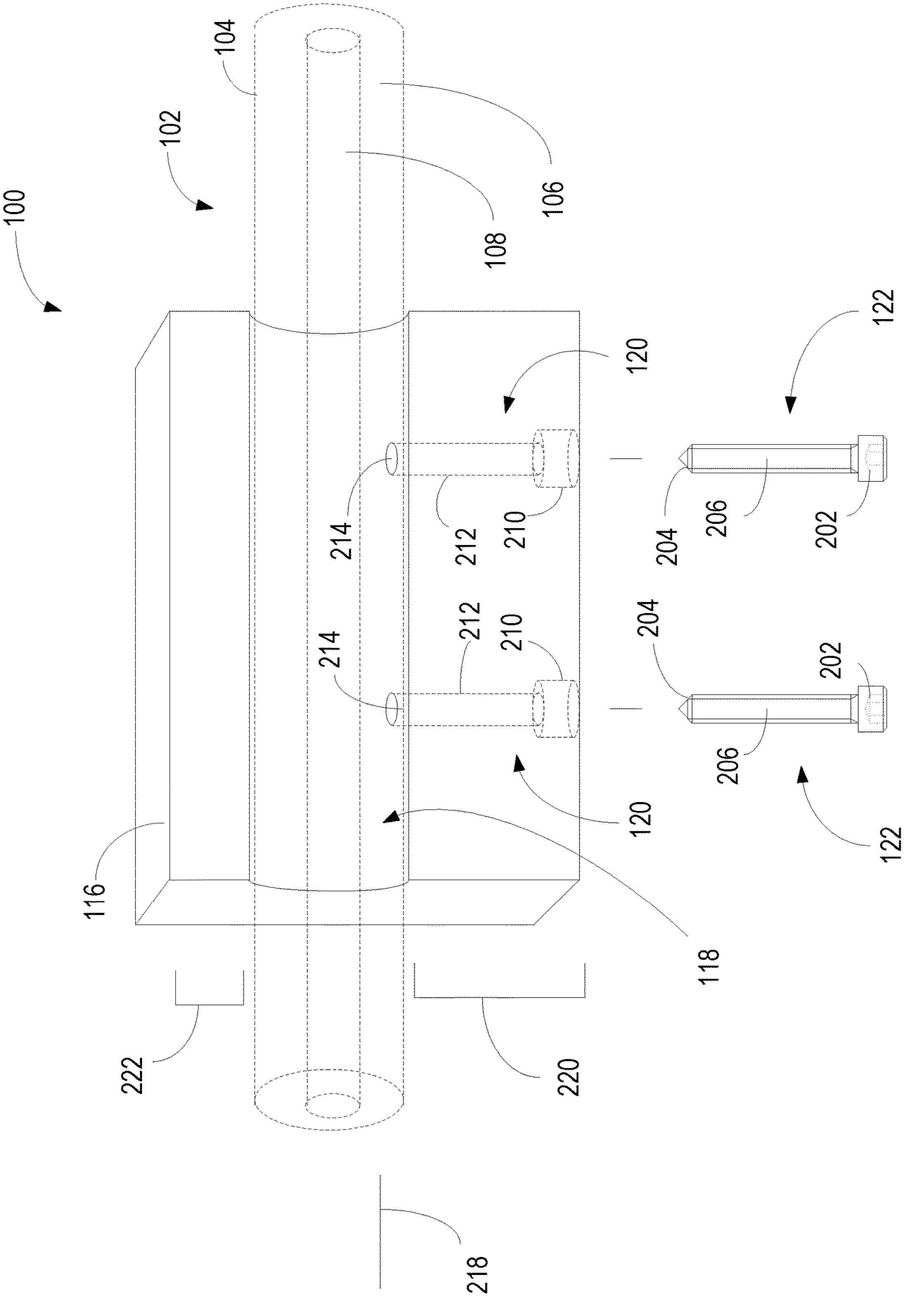
FIG. 2 illustrates a perspective bottom view of an example of an electric fence connection system.

FIG. 2 is a perspective bottom view of an example of the electric fence connection system 100. In the example of FIG. 2, at least a portion of an electric fence 102 is illustrated with dotted lines so as to better illustrate the features of the electric fence connection system 100. The electric fence 102 includes at least one polymer coated cable 104 having a power cable 108 and a surrounding conductive polymer 106. The electric fence connection system 100 includes a body 116 formed to include a channel or slot 118 to receive at least a portion of the electric fence 102.

In FIG. 2, the threaded fasteners 122 are illustrated as withdrawn from the threaded apertures 120. Each of the threaded fasteners 122 may include a head 202 at a proximate end, a conical tip 204 at a distal end and threads 206 along a shaft of the fastener 122 between the distal and the proximate end. The conical tip 204 may be formed to pierce the polymer coated cable 104 positioned in the slot 118.

The threaded apertures 120 may include an entry way orifice formed as a countersink bore 210 formed in the body 116 to receive the head 202, a threaded passageway 212 of smaller diameter than the countersink bore 210 to receive the threads 206, and an exit orifice 214 providing an ingress to the slot 118 through which the threaded fasteners 122 may extend such the conical tip 204 engages and pierces the polymer coated cable 104. Thus, the threaded aperture 120 includes a countersunk portion, which is the countersink bore 210 and a threaded portion, which is the passageway 212, such that the head 202 of the threaded fastener 122 is received in the countersunk portion, the threaded portion (threads 206) of the threaded fastener 122 is received in the threaded portion of the threaded aperture 120, and the conical tip 204 extends into the slot 118 to engage the polymer coated cable 104. Using the threaded relationship between the threaded aperture 120 and the threads 206, the conical tip 204 may be rotatable advanced into the channel 118 so as to extend into the polymer coated cable 104 and contact the power cable 108. The threaded apertures 120 may be positioned on the body 116 such that the threaded fasteners 122 intersect orthogonally with the polymer coated cable 104.

The slot or channel 118 may be formed in the body 116 to be offset from a central axis 218 of the body 116. The offset may provide a relatively wide first shoulder portion 220 of the body 116 on one side of the channel 118 and a relatively narrow second shoulder portion 222 of the body 116 on the other side of the channel 118. The first shoulder portion 220 of the body 116 may be sized to accommodate the threaded apertures 120 and threaded fasteners 122. In addition, the shoulder portion 220 may provide an offset to allow termination of a power cable at the body 116 while maintaining the power cable protruding from the body 116 spaced away from the electric fence 102. In other examples, the first and second shoulders 220 and 222 may be of equal width. In still other examples, the threaded apertures 120 and threaded fasteners 122 may be formed in the second shoulder 222.

Figure 3:
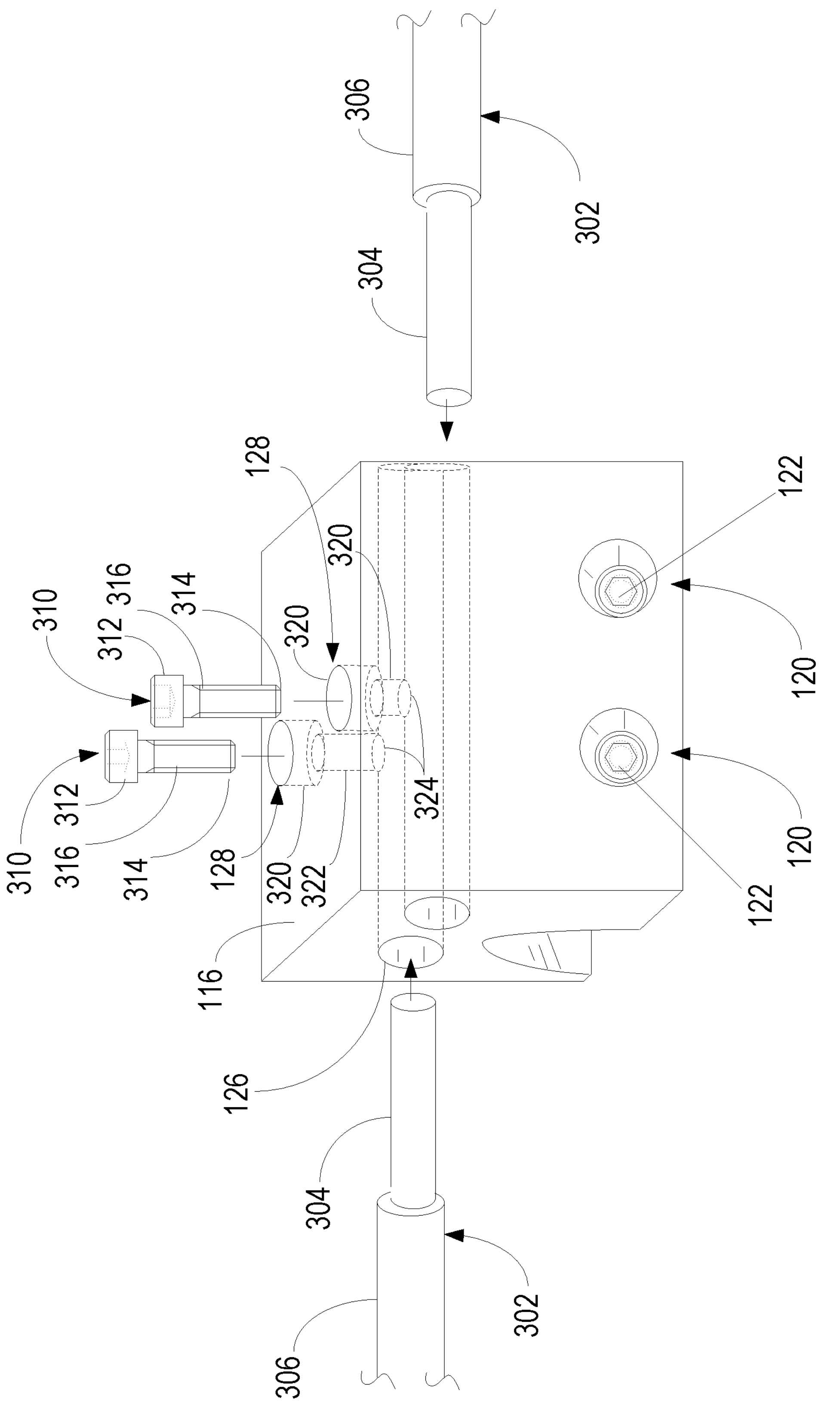
FIG. 3 is a perspective side view of an example of the electric fence connection system 100.

FIG. 3 is a perspective side view of an example of the electric fence connection system 100. Referring to FIGS. 1 and 3, the body 116 also includes one or more power apertures 126 formed in the body 116 to receive a power supply cable 302 (FIG. 3), and one or more keeper apertures 128 formed in the body 116 to intersect with the power apertures 126. As best illustrated in FIG. 3, one or more power supply cables 302 may be received in the power apertures 126. The power cable 302 may include a conductor 304 and an insulating jacket or cover 306. The insulating jacket or cover 306 may be removed along a portion of the power supply cable 302 such that the conductor 304 may extend into or through the power aperture 126 such that a portion of the conductor 304 is positioned at the intersection of the power aperture 126 and the keeper apertures 128 as best illustrated in FIG. 3, where the power aperture 126 and the keeper aperture 128 intersect orthogonally.

The keeper apertures 128 may be formed anywhere in the body 116 so as to intersect the power apertures 126. The keeper apertures 128 may be threaded apertures formed and sized to receive keeper fasteners 310, which are threaded. Each of the keeper fasteners 310 may include a head 312 at a proximate end, a tip 314 at a distal end and threads 316 along a shaft of the fastener 310 between the distal and the proximate end. The tip 314 may be formed as a flat surface to engage the surface of the conductor 304 and frictionally maintain the conductor 304 against an inner wall of body 116 forming the power aperture 126.

Each of the keeper apertures 128 may include an entry way orifice formed as a countersink bore 320 formed in the body 116 to receive the head 312, a threaded passageway 322 of smaller diameter than the countersink bore 320 to receive the threads 316, and an exit orifice 324 providing an ingress to the tunnel formed by the power aperture 126 through which the keeper fasteners 310 extend such that the tip 314 engages the surface of the conductor 304. Thus, the keeper aperture 128 includes a countersunk portion, which is the countersink bore 320 and a threaded portion, which is the passageway 322, such that the head 312 of the keeper fastener 310 is received in the countersunk portion and the threaded portion (threads 316) of the keeper fastener 310 is received in the threaded portion of the keeper aperture 128, and the tip 314 extends into the passageway of the power aperture 128 to engage the power supply cable 302.

Using the threaded relationship between the fastener aperture 128 and the threads 322, the tip 314 may be rotatable advanced into the power aperture 126 so as to create frictional contact between the wall of the power aperture 126, the conductor 304, and the tip 314. The keeper apertures 128 may be positioned on the body 116 such that the keeper fasteners 310 intersect orthogonally with the conductor 304. Alternatively, the keeper apertures 128 may be positioned on the body 116 such that the keeper fasteners 310 intersect transverse to the conductor 304. Contact between the keeper fasteners and the conductor 304 is maintained to create a frictional rigid coupling between the body 116 and the conductor 304.

The body 116 may be formed of a conductive material, such as aluminum, which allows the flow of current from the conductor 304 through the body 116 to the polymer coated cable 104. In addition or alternatively, current may flow from the conductor 304 through the body 116, through the threaded fasteners 122, to polymer coated cable 104. In alternative examples, the body 116 may be formed of plastic or other non-conducting material, and conductors formed within the body, such as metal channels or busses included in or on the plastic may provide current flow between the keeper fasteners 310 and the threaded fasteners 122. In still other alternative examples flow of current through the keeper fasteners 310 may be omitted by providing conductive material or busses within the wall of the keeper apertures 128 such at the keeper fasteners 310 urge the conductor 304 into contact with the conductive material, and the conductive material provides a current flow path to the threaded fasteners 122.

In alternative examples, the keeper apertures 128 and keeper fasteners 310 may be omitted. Instead, internal keeper fasteners which include a latching mechanism may be positioned within the power apertures 126 such that the conductor 304 may be inserted into the power aperture 126 in an entry direction, and pulled in the opposite direction to engage the latching mechanism of the internal keeper fastener. Conceptually the latching mechanism may operate as a constricting latch mechanism similar to a "Chinese finger trap" to provide a frictional grip on the conductor 304 within the power aperture 126 by constricting around the conductor 304 upon the conductor 304 being moved in the extraction direction. The internal keeper fastener may then move the conductor 304 into contact with body 116, an electrical bus, or other form of conductor to provide a current path to the threaded fastener 122. In other examples, other forms of electrical termination are possible.

A method of forming an electric fence connection using the electric fence connection system includes mounting a body on a polymer coated flexible rail by positioning a part of the polymer coated flexible rail in a channel included in the body. After positioning the body, threading a fastener into a threaded aperture formed in the body such that the fastener extends through the body into the channel. Penetrating the polymer coated flexible rail with a tip of the fastener, and forming an electrical connection between an electric conductor included within the polymer coated flexible rail and the fastener. In addition, coupling a power supply cable with the body; and supplying power from the power supply cable to the electric conductor via the fastener. Following the coupling of the power supply cable, conducting electrical current supplied by the power supply cable through the body and the fastener to the electric conductor. When mounting the body on the polymer coated flexible rail, the body may be secured to the flexible rail with the fastener by rotatably threading the fastener into the threaded aperture formed in the body. In this way, the polymer coated flexible rail becomes engaged with the fastener to secure the body to the flexible rail. Also, coupling a power supply cable with the body includes inserting the power supply cable into a power aperture formed in the body, and securing the power supply cable in the power aperture.

All of the discussion, regardless of the particular implementation described, is illustrative in nature, rather than limiting. For example, although selected aspects, features, or components of the implementations are depicted in the figures as being a particular type of component, other components have similar functionality are possible. Thus, although specific components are described above, methods, systems, and articles of manufacture described herein may include additional, fewer, or different components. Further, to clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined in the broadest sense, superseding any other implied definitions hereinbefore or hereinafter unless expressly asserted by the Applicant to the contrary, to mean one or more elements selected from the group comprising A, B, and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations. Furthermore, the advantages described above are not necessarily the only advantages, and it is not necessarily expected that all of the described advantages will be achieved with every embodiment.

What is claimed is:

1. An electric fence connection system comprising:

a body formed of an electrically conducting material, the body comprising a slot having a pair of opposing sidewalls and a back wall formed with the body as three sides defining a predetermined width and depth of the slot, a fourth side of the slot opposite the back wall being an opening having the predetermined width to mount the body on a polymer coated cable such that at least a portion of the polymer coated cable is surrounded by the body on no more than three sides of the polymer coated cable;

the body also formed to include a first threaded aperture that extends through the body to the slot;

a first threaded fastener sized to threadably engage the first threaded aperture, the first threaded fastener comprising a head at a proximate end, a conical tip at a distal end and threads along a shaft of the fastener between the distal and the proximate end, the conical tip formed to pierce the polymer coated cable positioned in the slot and rigidly secure the body straddling the polymer coated cable with the opposing sidewalls; and the body also formed with a second aperture formed to receive a power supply cable to supply electrical power to the polymer coated cable via the body and the first threaded fastener.

2. The electric fence connection system of claim 1, wherein the slot is offset from a central axis of the body in a first direction, and the second aperture is offset from central axis of the body in a second direction opposite the first direction such that the power supply cable received in the body is spaced away from the polymer coated cable.

3. The electric fence connection system of claim 1, wherein the threaded aperture comprises a countersunk portion and a threaded portion, wherein the head of the first threaded fastener is received in the countersunk portion and the threaded portion of the fastener is received in the threaded portion of the threaded aperture, and the conical tip extends into the slot to engage the polymer coated cable.

4. The electric fence connection system of claim 1, wherein the first threaded fastener intersects the polymer coated cable orthogonally.

5. The electric fence connection system of claim 1, further comprising:

a third threaded aperture, the third threaded aperture formed to orthogonally intersect the second aperture; and a second threaded fastener sized to threadably engage the third threaded aperture and extend into the second aperture to contact the power supply cable.

6. The electric fence connection system of claim 1, wherein the power supply cable is surrounded on three sides-by the body.

7. The electric fence connection system of claim 1, wherein the polymer coated cables includes a polymer coating concentrically surrounding a power cable, and the polymer coated cable extends into the slot to the predetermined depth so as to align the power cable with the conical tip of the first threaded fastener.

8. The electric fence connection system of claim 1, wherein the polymer coated cable is a plurality of polymer coated cables fixedly held in a spaced apart configuration by a polymer web between the polymer coated cables, and a first portion of one of the plurality of polymer coated cables is surrounded by the body on the three sides, and the polymer web extends away from a second portion of the one of the plurality of polymer coated cables to another of the plurality of polymer coated cables; wherein the first portion and the second portion are on opposite sides of the one of the plurality of polymer coated cables.

9. An electric fence connection system comprising:

an electrically conductive body formed with a channel to mount the body on one of a plurality of electrically conductive polymer coated flexible rails, the polymer coated flexible rails including a plurality of cables fixedly spaced apart by a polymer web extending therebetween, wherein the body is mounted on a first side of the one of the plurality of polymer coated flexible rails opposite the polymer web such that the polymer web extends away from the channel on a second side of the one of the plurality of polymer coated flexible rails, the first and second sides being opposite sides of the one of the plurality of polymer coated flexible rails;

a fastener coupled with the body and extending through the body into the channel, the fastener comprising a piercing feature at a distal end so as to pierce the one of the plurality of polymer coated flexible rails; and an aperture formed in the body to receive a power supply cable, the power supply cable operable to supply power to the plurality of polymer coated flexible rails via the electrically conductive body and the fastener.

10. The electric fence connection system of claim 9, wherein the fastener and the body are operable to conduct current and voltage from the power supply cable to the plurality of electrically conductive polymer coated flexible rails.

11. The electric fence connection system of claim 9, wherein the fastener is operable to couple the one of the plurality of polymer coated flexible rails and the body by frictional compression so as to maintain the body fixedly and contiguously mounted on the one of the plurality of polymer coated flexible rails with a rigid connection therebetween.

12. The electric fence connection system of claim 9, further comprising a keeper mechanism operable to maintain the power supply cable in the aperture formed in the body.

13. The electric fence connection system of claim 12, wherein the keeper mechanism includes a keeper fastener that threadably engages a keeper aperture formed in the body, and extends into the aperture to frictionally contact the power supply cable with a wall defining the aperture.

14. The electric fence connection system of claim 12, wherein the keeper mechanism is included in the aperture.

15. A method of forming an electric fence connection comprising:

mounting a body on one of a plurality of polymer coated flexible rails included in an electric fence, the plurality of polymer coated flexible rails included as part of a polymer web extending between the plurality of polymer coated rails, wherein mounting the body comprises positioning a part of the one of the plurality of polymer coated flexible rails in a channel included in the body such that the polymer web extends out of the channel and away from the body;

threading a fastener into a threaded aperture formed in the body such that the fastener extends through the body into the channel;

penetrating the one of the plurality of polymer coated flexible rails with a tip of the fastener and fixedly securing the one of the plurality of polymer coated flexible rails against an inner surface of the channel;

forming an electrical connection between the plurality of polymer coated flexible rails and the fastener;

coupling a power supply cable with the body; and supplying power from the power supply cable to the plurality of polymer coated flexible rails via the body and the fastener.

16. The method of claim 15, further comprising conducting electrical current supplied by the power supply cable through the body and the fastener to the electric conductor.

17. The method of claim 15, wherein mounting the body on one of the plurality of polymer coated flexible rails comprises the step of securing the body to the one of the plurality of polymer coated flexible rails with the fastener; and threading the fastener into the threaded aperture formed in the body comprising engaging the one of the plurality of polymer coated flexible rails with the fastener to secure the body to the one of the plurality of polymer coated flexible rails.

18. The method of claim 15, wherein coupling a power supply cable with the body comprises inserting the power supply cable into a power aperture formed in the body; and securing the power supply cable in the power aperture.

19. The electric fence connection system of claim 9, wherein the channel is offset from a central axis of the body forming a first shoulder portion of the body on a first side of the channel and a second shoulder portion of the body on a second side of the channel, the first shoulder being wider than the second shoulder, and the aperture formed in the body to receive the power supply cable being disposed in the first shoulder.

* * * * *